United States Patent
Kim et al.

(10) Patent No.: US 9,731,995 B2
(45) Date of Patent: Aug. 15, 2017

(54) LITHIUM SILICATE AMORPHOUS OR CRYSTALLINE GLASS OVERLAYING TOP SURFACE OF ZIRCONIA AND PREPARATION METHODS THEREOF

(71) Applicant: Hass Co., Ltd., Gangneung-si (KR)

(72) Inventors: Yong su Kim, Gangneung-si (KR); Hyun jun Jeon, Busan (KR); Hyung bong Lim, Ansan-si (KR); Kyung sik Oh, Incheon (KR); Sung ho Ha, Ansan-si (KR); Jin su Jeong, Donghae-si (KR); Cheol young Kim, Seoul (KR)

(73) Assignee: Hass Co., Ltd., Gangneung-si (KR)

( * ) Notice: Subject to any disclaimer, the term of this patent is extended or adjusted under 35 U.S.C. 154(b) by 159 days.

(21) Appl. No.: 14/513,733

(22) Filed: Oct. 14, 2014

(65) Prior Publication Data
US 2015/0104655 A1    Apr. 16, 2015

(30) Foreign Application Priority Data

Oct. 14, 2013  (KR) ........................ 10-2013-0121859

(51) Int. Cl.
| C03B 19/02 | (2006.01) |
| C03B 23/00 | (2006.01) |
| C03C 10/00 | (2006.01) |
| C03B 32/02 | (2006.01) |
| B32B 17/06 | (2006.01) |
| C03B 11/08 | (2006.01) |
| C03C 3/097 | (2006.01) |
| C03C 4/00 | (2006.01) |

(52) U.S. Cl.
CPC .......... *C03C 10/0027* (2013.01); *B32B 17/06* (2013.01); *C03B 11/08* (2013.01); *C03B 19/02* (2013.01); *C03B 32/02* (2013.01); *C03C 3/097* (2013.01); *C03C 4/0021* (2013.01)

(58) Field of Classification Search
CPC ...... C03B 19/02; C03B 23/00; C03B 23/0013
USPC .................................................. 65/33.1, 33.5
See application file for complete search history.

(56) References Cited

U.S. PATENT DOCUMENTS

| 3,804,608 | A | 4/1974 | Gaskell et al. |
| 4,189,325 | A | 2/1980 | Barrett et al. |
| 4,515,634 | A | 5/1985 | Wu et al. |
| 5,219,799 | A | 6/1993 | Beall et al. |
| 5,702,514 | A | 12/1997 | Petticrew |
| 5,968,856 | A | 10/1999 | Schweiger et al. |
| 6,342,458 | B1 | 1/2002 | Schweiger et al. |
| 6,372,319 | B1 | 4/2002 | Abe et al. |
| 6,375,729 | B1 | 4/2002 | Brodkin et al. |
| 6,420,288 | B2 | 7/2002 | Schweiger et al. |
| 6,455,451 | B1 | 9/2002 | Brodkin et al. |
| 6,495,480 | B1 | 12/2002 | Goto |
| 6,514,893 | B1 | 2/2003 | Schweiger et al. |
| 6,517,623 | B1 | 2/2003 | Brodkin et al. |
| 6,606,884 | B2 | 8/2003 | Schweiger et al. |
| 6,802,894 | B2 | 10/2004 | Brodkin et al. |
| 6,818,573 | B2 | 11/2004 | Petticrew |
| 2003/0073563 | A1* | 4/2003 | Brodkin ................. C03B 19/06 501/5 |
| 2005/0023710 | A1* | 2/2005 | Brodkin ............. A61C 13/0003 264/16 |
| 2005/0098064 | A1* | 5/2005 | Schweiger .......... C03C 10/0027 106/35 |
| 2005/0127544 | A1 | 6/2005 | Brodkin et al. |
| 2011/0009254 | A1 | 1/2011 | Schweiger et al. |
| 2015/0374465 | A1 | 12/2015 | Burke et al. |

FOREIGN PATENT DOCUMENTS

| EP | 1253116 | 10/2002 |
| EP | 1005841 | 2/2005 |
| EP | 1534169 | 3/2006 |
| EP | 2765119 | 8/2014 |
| JP | 2000086289 | 3/2000 |
| JP | 2011225441 | 11/2011 |
| JP | 2012-250911 | 12/2012 |
| KR | 1020120073710 | 7/2012 |
| KR | 10-1262121 | 5/2013 |
| WO | 2013/086187 | 6/2013 |

OTHER PUBLICATIONS

Non-Final Office Action dated Nov. 19, 2015, in U.S. Appl. No. 14/539,965.
Notice of Allowance issued Apr. 19, 2016, in U.S. Appl. No. 14/539,965.
Extended European Search Report dated May 11, 2017, in European Patent Application No. 14853199.9.

* cited by examiner

*Primary Examiner* — Cynthia Szewczyk
(74) *Attorney, Agent, or Firm* — H.C. Park & Associates, PLC

(57) ABSTRACT

Exemplary embodiments of the present disclosure provide a lithium silicate crystalline or amorphous glass overlaying the top surfaces of zirconia and the manufacturing process thereof. More specifically, exemplary embodiments of the present disclosure provide a lithium silicate glass or lithium silicate crystalline glass with high light transmittance and good coloring characteristics and the manufacturing process thereof, which overlays the top surface of zirconia with high mechanical strength, frameworks, or copings.
The lithium silicate crystalline or amorphous glass may include 10-15 wt % $Li_2O$, 71.1-85.0 wt % $SiO_2$, 2-5 wt % $P_2O_5$ working as nuclear formation agent, 1-5 wt % $Al_2O_3$ to increase glass transition temperature and softening temperature, as well as chemical durability of the glass, and 0.01-1.0 wt % $ZrO_2$ which increases the binding strength of the zirconia substructure.

6 Claims, 4 Drawing Sheets

LITHIUM SILICATE AMORPHOUS OR CRYSTALLINE GLASS OVERLAYING TOP SURFACE OF ZIRCONIA AND PREPARATION METHODS THEREOF

CROSS-REFERENCE TO RELATED APPLICATION

This application claims priority from and the benefit of Korean Patent Application No. 10-2013-0121859, filed on Oct. 14, 2013, which is hereby incorporated by reference for all purposes as if fully set forth herein.

BACKGROUND

Field

The present disclosure relates to a lithium silicate crystalline or amorphous glass composition overlaying the top surfaces of zirconia and the manufacturing process of such products, more particularly to, a lithium silicate amorphous glass or lithium silicate crystalline glass composition with high light transmittance and good coloring characteristics and manufacturing processes of such products, which overlay the top surface of zirconia with high mechanical strength frameworks or copings.

Discussion of the Background

With increased interest in appearance from economic development and increased income, the aesthetic aspect of prosthetic dental materials gains high attention. This leads to the introduction to different kinds of prosthetic restoration materials with aesthetic functions, and also to the development of various non-metal restoration materials.

Dental ceramic materials for restoring a damaged tooth can be classified to a coping material for substructure, and aesthetic crowns depending on the material characteristic demands. Coping is a part of artificial teeth prosthesis that refers to a saddle-like covering placed on the top of abutments or a damaged tooth, on which crown materials similar to a dentin layer are placed.

Dental coping distributes and/or absorbs various occlusal loading transferred through a crown, thus requiring high mechanical properties. Common ceramic materials for coping include glass-infiltrated alumina, zirconia, and the like. Though it shows excellent value accuracy from near-net shape characteristics by infiltrating glass to preparatory porous alumina mold structures, glass-infiltrated alumina has low biaxial flexural strength, e.g., less than 450 MPa. Though it has an excellent mechanical property over 1200 MPa, zirconia has low light transmittance or poor coloring characteristics. Therefore, developments of these coping materials are focused on high light transmittance and good coloring characteristic with high shear modulus.

Crown materials refer to prosthetic materials for restoration of damaged teeth surfaces similar to dentin and enamel. Crown materials are classified into inlay, onlay, veneer, and crown depending on the area to which they are applied. Since crowns are applied to the outmost surfaces or teeth, not only aesthetic traits are highly necessary, but also high strength is demanded to endure chipping and/or wear against opposing dentition. Materials previously developed for crowns are leucite glass ceramics, reinforced porcelain, and fluorapatite $(Ca_5(PO_4)_3F)$ crystalline glass. Though they have high aesthetic traits, they are subject to fracture due to low flexural strength, e.g., around 80 to 120 MPa. Therefore, various crown materials with high strength are being developed.

Monolithic dental crown materials employing crystalline glass including lithium disilicate have been introduced. Though this crystalline glass may have high aesthetic traits, the mechanical strength of monolithic crown manufactured by the method is low around 300 to 400 MPa, which is not adequate for posterior teeth or bridges exposed to high stress.

Further, prosthetic materials reinforced by coating crystalline glass on the top of a zirconia substructure may be produced. More specifically, coating crystalline glass on the top of a zirconia substructure is characterized with the extension of the applicable area of crystalline glass by allowing its veneering on the top surfaces of zirconia. Unlike techniques which build up dentin by coating the top surfaces of zirconia with fluorapatite or porcelain powder, this method builds up dentin with aesthetic materials on zirconia by casting crystalline glass in an ingot shape at high pressure. However, the layer with aesthetic materials still has low strength with danger of fracture, which leads to continuing research on glass properties to overcome this problem.

SUMMARY

Exemplary embodiments of the present disclosure provide for manufacture of crystalline glass or lithium silicate glass overlaying the top surfaces of zirconia.

Exemplary embodiments of the present disclosure provide a way to improve the binding strength of crystalline glass or lithium silicate glass overlaying the top surfaces of zirconia.

Exemplary embodiments of the present disclosure provide for lithium silicate crystalline or amorphous glass overlaying the top surfaces or zirconia presented herein to include 10-15 wt % $Li_2O$, 71.1-85.0 wt % $SiO_2$, 2-5 wt % $P_2O_5$ working as nuclear formation agent, 1-5 wt % $Al_2O_3$ to increase glass transition temperature and softening temperature, as well as chemical durability of the glass, and 0.01-1.0 wt % $ZrO_2$ which increases the binding strength of the aforementioned zirconia substructure.

Additional features of the invention will be set forth in the description which follows, and in part will be apparent from the description, or may be learned by practice of the invention.

The lithium silicate crystalline glass overlaying the top surfaces of zirconia according to an exemplary embodiment has three times more flexural strength than other porcelain or fluorapatite previously used for built-up on the top surfaces of zirconia. Since it is three times stronger, it reduces the danger of fracture. The surface reinforcement from ion exchange can enhance biaxial flexural strength of lithium disilicate by 1.5 times. As a whole, it brings about strength enhancement by more than four times, which is much higher value than other well-known aesthetic materials (porcelain, leucite, lithium disilicate, etc)

Though other bridges only use high strength zirconia which lacks aesthetic functions and is avoided for use in anterior teeth, the crystalline glass disclosed in this disclosure enables the manufacture of the bridges with both aesthetic traits and high flexural strength.

Since it does not require the total replacement of the glass in case of local fracture or crack, and the partial restoration of and binding to damaged area alone are possible, it helps cost reduction.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
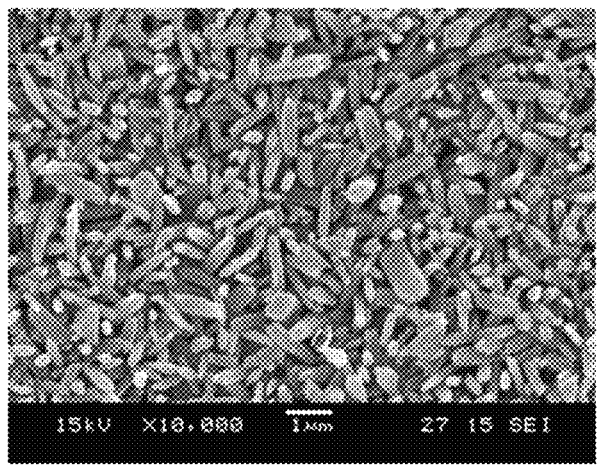
FIG. 1 illustrates a microscopic structure of the lithium disilicate according to an exemplary embodiment of the present invention.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments. Throughout the drawings and the detailed description, unless otherwise described, the same reference numerals will be understood to refer to the same respective elements, features, and structures. The relative size and depiction of these elements may be exaggerated for clarity, illustration, and convenience.

The terminology used herein is for the purpose of describing particular embodiments only and is not intended to be limiting of the present disclosure. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The lithium silicate crystalline glass and the manufacturing process thereof will be described hereinafter with reference to FIG. 1 through FIG. 6.

FIG. 1 illustrates a microscopic structure of the lithium disilicate according to an exemplary embodiment of the present invention. The microscopic structure of the lithium disilicate according to an exemplary embodiment of the present invention will be described with reference to FIG. 1.

The high strength dental crystalline glass presented herein includes crystal and amorphous lithium disilicate. Since its color is very similar to that of teeth providing aesthetic traits, it is suitable for dental material.

Figure 2:
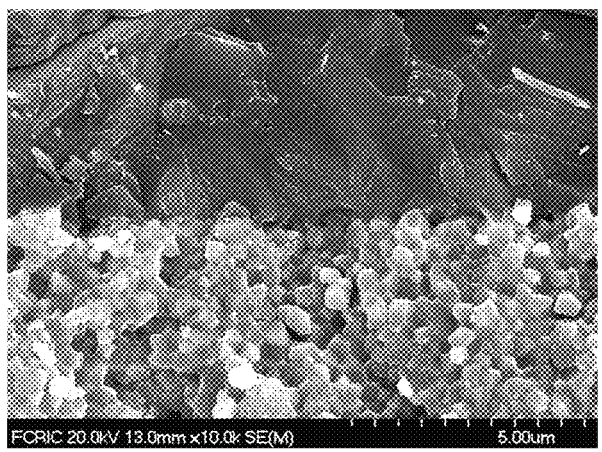
FIG. 2 illustrates a joint interface of the lithium disilicate crystalline glass and zirconia according to an exemplary embodiment of the present invention.
Figure 3:
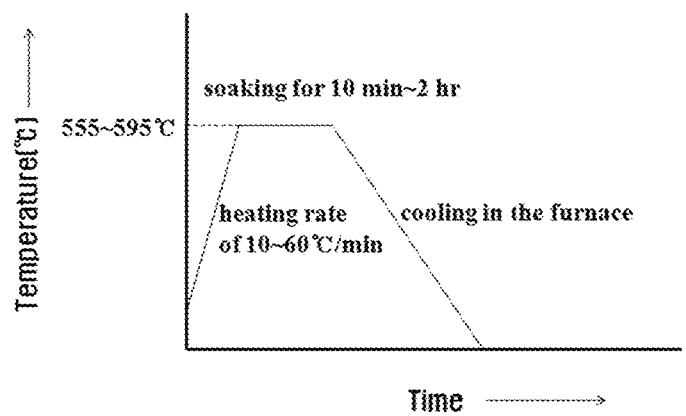
FIG. 3 illustrates the first crystallizing heat treatment process according to an exemplary embodiment of the present invention.

As shown in FIG. 1, lithium disilicate crystals in needle shapes intertwined to each other provide high strength. The high strength dental crystalline glass is not exclusively lithium disilicate ($Li_2Si_2O_5$), but can be also one of lithium metasilicate ($Li_2SiO_3$), lithium phosphate ($Li_3PO_4$), cristobalite ($SiO_2$), tridymite, quartz ($SiO_2$), or spodumene ($LiAlSi_2O_6$). The amorphous or crystalline glass is bound to the top surfaces of zirconia providing both strength and aesthetic traits, also extending its application to posterior teeth exposed to high load. FIG. 2 depicts the high binding strength at the interface between zirconia and lithium silicate crystalline glass. Hereinafter, the manufacturing process of lithium disilicate crystalline glass for dentistry according to an exemplary embodiment of the present invention will be described.

The high strength dental crystalline glass may be the one containing lithium disilicate crystals, lithium silicate crystals, and lithium phosphate crystal, which may contain 10-15 wt % $Li_2O$ and 71.1-85.0 wt % $SiO_2$ as main compositions for the glass, 2-5% $P_2O_5$ as a nuclear formation agent, 1-5 wt % $Al_2O_3$ to increase glass transition temperature and softening temperature, as well as chemical durability of the glass, and 0.01-1.0 wt % zirconia ($ZrO_2$) which increases the binding strength of the aforementioned zirconia substructures, and may affect coloring, brightness, and/or saturation. It also contains 0.1-6.5 wt % $B_2O_3$ in reducing crystal size and crystal formation temperature by decreasing the viscosity during melting for glass formation, 0.1-7 wt % alkali oxides to enhance melting properties during melting.

Alkali oxides may be either $K_2O$ or $Na_2O$, or a mixture including both at any ratio.

The optimal weight ratio of $SiO_2$ and $Li_2O$ ($SiO_2$ content:/$Li_2O$ content) is 2:1 to 10:1 considering the final composition of lithium disilicate crystal in the crystalline glass.

Further, the high strength dental crystalline glass from the exemplary embodiment may contain additional 0.001-3 wt % MgO to increase durability for thermal denaturation.

Further, the high strength dental crystalline glass from the exemplary embodiment may contain additional 0.001-3 wt % $MnO_2$ to decrease the formation temperature of lithium disilicate, and to increase color harmony with teeth by reflecting ivory or brown color.

Further, the high strength dental crystalline glass from the exemplary embodiment may contain additional 0.01-5 wt % coloring agent to provide the same or similar color with teeth. The coloring agent is to provide the same, similar, and fluorescent color, including inorganic coloring agent ($TiO_2$) for white, red iron oxide ($Fe_2O_3$), ceria ($CeO_2$) for yellow, vanadium (V) oxide ($V_2O_5$) for orange, $V_2O_3$, $Er_2O_3$, $La_2O_3$, $Tb_2O_3$, $Pr_2O_3$, $Y_2O_3$, $TaO_2$, $MnO_2$ or their mixture for black. For example, red iron oxide ($Fe_2O_3$), ceria ($CeO_2$), or vanadium (V) oxide ($V_2O_5$) is mixed with starting materials, which provides yellow similar to teeth during melting, while $TiO_2$ show white very similar to teeth color.

$Li_2CO_3$ instead of $Li_2O$ may be added when aforementioned starting materials are weighed and mixed. Carbon dioxide ($CO_2$) from carbon component of $Li_2CO_3$ escapes as gas during glass melting process. For alkali oxide, $K_2CO_3$ and/or $Na_2CO_3$ instead of $K_2O$ and $Na_2O$ may be added, and carbon dioxide ($CO_2$) from carbon component of $K_2CO_3$ and/or $Na_2CO_3$ escapes as gas during glass melting process.

The mixing process employs dry mixing process, one of which is ball milling. The starting materials are introduced to a ball milling machine, which rotates at a constant speed to mechanically grind and mix uniformly. The balls for milling may be ceramic composed of zirconia and alumina, and they may have a uniform or two different sizes. The size of balls, milling duration, and rotation per minute (rpm) are controlled according to the desired size of particles. For example, considering particles size, the size of balls may be around 1-30 mm, rpm of the ball milling machine may be set to 50-500 rpm. It is desired to run the machine for 1 to 48 hours depending on particles size. The starting material turns into fine particles with uniform size, mixed uniformly.

The starting materials are melted in a melting furnace after they are placed in it. Melting means the phase transition of the starting materials from solid to liquid with viscosity. Because it requires high melting point, high strength, and high contact angle to prevent the start materials from being stuck on the furnace surface, the melting furnace made from materials like platinum, diamond-like-carbon (DLC), or chamotte, or the one coated with platinum or DLC is highly recommended.

The recommended melting conditions are 1400-2000° C. for 1 to 12 hours at an atmospheric pressure. Since the starting materials may not melt under 1400° C., and the process demands unnecessary high energy input above 2000° C., the recommended temperature range should be kept. Too long melting time is not advised due to excessive energy consumption, making the process uneconomical. The temperature ramping rate is recommended to be 5-50° C. Because too slow a rate decreases the productivity due to long processing time, and too high a rate increases volatility resulting in poor crystalline glass properties, the aforementioned ramping rate is highly recommended. Oxidizing environments such as oxygen or air atmosphere are recommended.

Melted material is poured onto specific die molds to obtain dental crystalline glass with desired shapes and sizes. High melting point, high strength, and high contact angle to prevent it from being stuck on surfaces are required for the materials for these die molds. Graphite and carbon are such materials, which need preheat to 200-400° C. before pouring melted materials into die molds to prevent heat shock.

After the melting materials in the molds cool down to 60-100° C., nuclear formation and crystal growth of glass are implemented after being transferred to heat treatment incinerator. The conditions for nuclear formation and crystal growth are recommended at 555-595° C. for 10-120 minutes at an atmospheric pressure as described in FIG. 3. While nuclear formation and crystal growth progress fast under these conditions, lithium metasilicate becomes the main crystal phase. Heat processing temperature under 555° C. does not induce enough crystal growth being limited by insufficient decrease in viscosity caused by phase transition of glass powder, which also produce mostly amorphous phases. On the contrary, the temperature above 595° C. is not economical due to excessive energy consumption, which may also induce excessive crystal growth resulting in unwanted physical properties. The aforementioned temperature range is recommended to avoid these problems.

Insufficient heat treatment duration may result in insufficient crystal growth, and extended heat treatment duration is not economical due to excessive energy consumption. The temperature ramping rate toward the heat treatment temperature is recommended at 10-60° C. Because too slow a rate decreases the productivity due to long processing time, and too high a rate increases volatility resulting in poor crystalline glass properties, the aforementioned ramping rate is highly recommended. Oxidizing environments such as oxygen or air atmosphere are recommended. Crystalline glass can be obtained from crystallization, which includes lithium silicate crystal caused by crystal growth from heat treatment.

The resulting crystal species and contents obtained through the heat treatment may vary. The crystal growth of lithium metasilicate ($Li_2SiO_3$), lithium disilicate ($Li_2Si_2O_5$), lithium phosphate ($Li_3PO_4$), cristobalite ($SiO_2$), tridymite, quartz ($SiO_2$), or spodumene ($LiAlSi_2O_6$) may occur due to heat treatment temperature, and species and contents of the crystals may vary due to the composition and components of starting materials.

The block obtained from aforementioned crystallizing heat treatment is made into crown shapes through pressurized casting and cutting, or may be placed directly on zirconia substructures with pressurized casting process.

Figure 4:
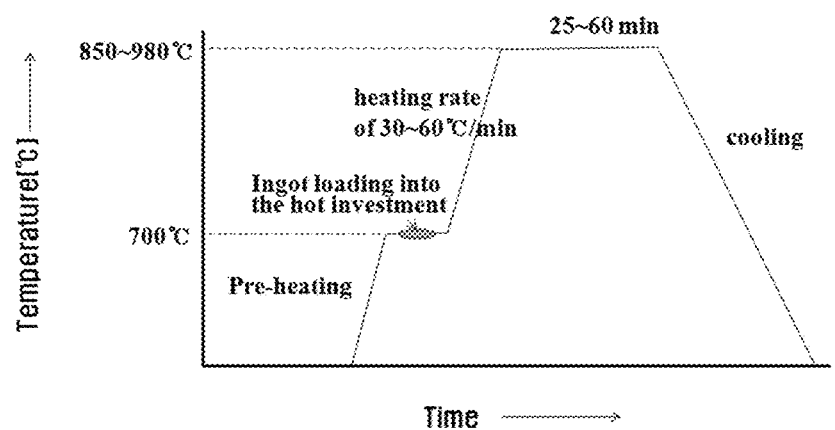
FIG. 4 illustrates a high pressure casting heat treatment according to an exemplary embodiment of the present invention.
Figure 5:
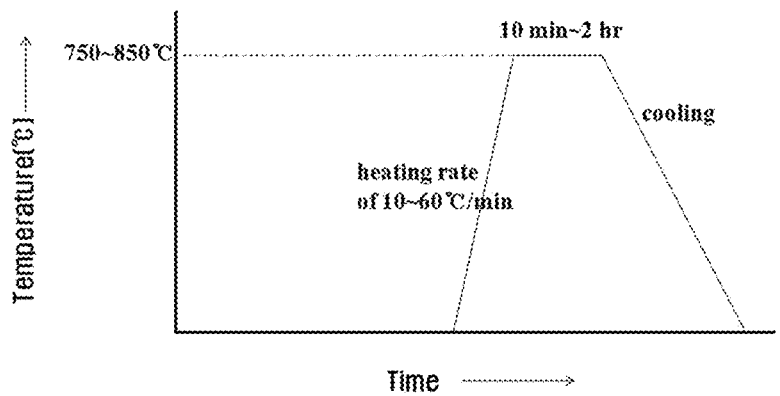
FIG. 5 illustrates the second heat treatment, crystallization, after CAD/CAM processing according to an exemplary embodiment of the present invention.
Figure 6:
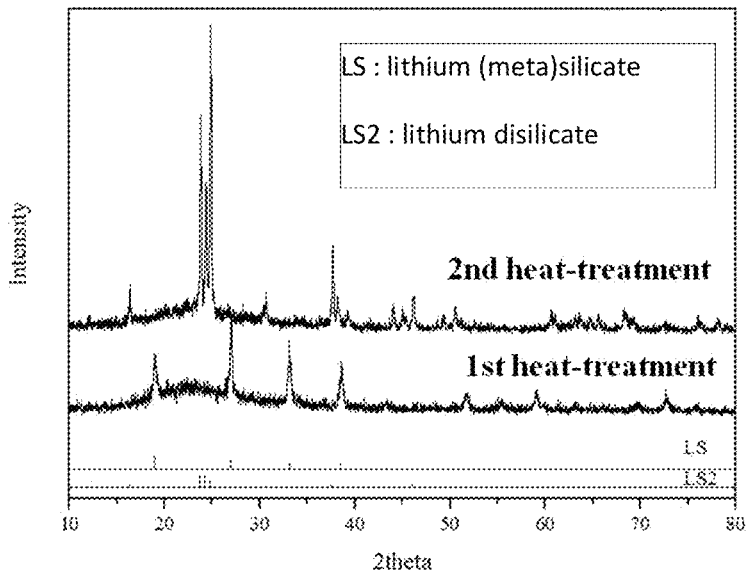
FIG. 6 illustrates the result regarding crystal phase analyses after the first and second heat treatment according to an exemplary embodiment of the present invention.
Figure 7:
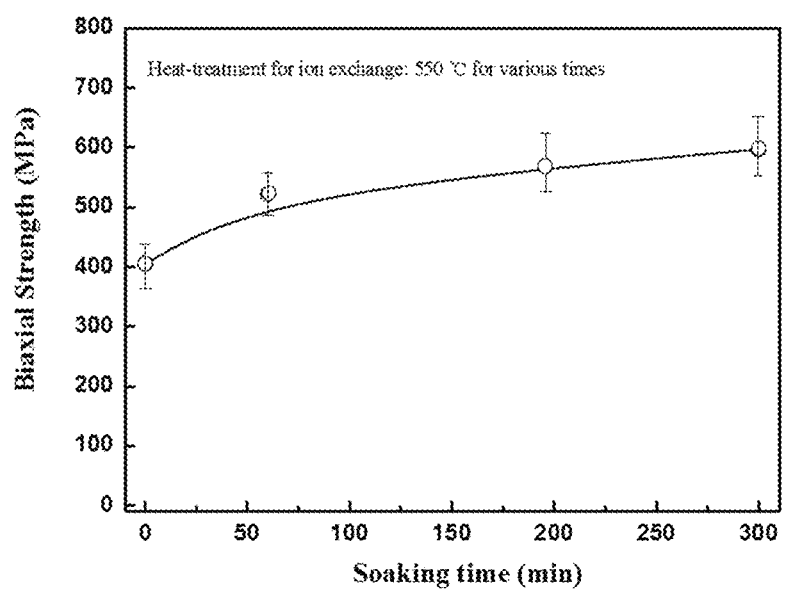
FIG. 7 illustrates the change in biaxial flexural strength as a function of duration for ion reinforcement according to an exemplary embodiment of the present invention.

As depicted in FIG. 4, the pressurized casting process decreases the viscosity of crystalline glass ingot at 850-980° C., followed by pressing it into an empty space in a form of a crown located inside of the investment. At the same time, lithium metasilicate crystal phase transits into lithium disilicate crystal phase, while some remain as lithium metasilicate crystal phase. After lithium metasilicate crystalline block is cut into crown shapes with CAD/CAM equipment, heat treatment at 750-850° C., as shown in FIG. 5, produces crystalline glass crown composed of lithium disilicate, lithium metasilicate, lithium phosphate crystals.

In general, lithium metasilicate crystal is the main crystal phase after the first heat treatment, while lithium disilicate crystal becomes the main after the second treatment.

The crown-shaped lithium silicate crystalline glass from aforementioned processes is bound to zirconia substructures, which utilize cementation and heat-treated joining from binding agent to place lithium silicate crystalline glass on zirconia substructures. Cementation uses existing photosynthetic binding agents. Heat-treated joining is more suitable for high binding strength and the stability of the binding interface. This method uses inorganic binding agents composed of complex metal oxides, which undergoes heat treatment at 720-850° C. for 1-120 minutes and binds the crystalline glass to zirconia substructures. Temperature under 720° C. decreases binding strength, while temperature over 850° C. may deform the crystalline glass in crown shapes.

Lithium silicate amorphous or crystalline glass may be directly placed on zirconia substructure with pressurized casting. Zirconia substructures may be placed in an investment, then the space for glass materials may be made with the lost wax method. Though lithium silicate amorphous or crystalline glass can be cast at high pressure directly on the top surfaces of zirconia, coating the binding agent first on the zirconia substructures is recommended by heat treating at 750-1000° C. to increase the binding strength, followed by pressurized casting to place lithium silicate amorphous or crystalline glass. The binding agent not only increases the binding strength, but also enhances wettability of the glass. The inorganic binding agent does not melt under 750° C., while temperature over 1000° C. causes surface tension due to low viscosity, resulting in uneven covering of zirconia surface.

The binding agent requires high interface wettability on zirconia, and the component capable of corroding a part of zirconia surfaces. Therefore, this embodiment presents the binding agent with its compositions as described in Table 1. As coloring and fluorescent characteristics are required, titanium oxide ($TiO_2$), red iron oxide ($Fe_2O_3$), ceria ($CeO_2$) for yellow color, vanadium (V) oxide ($V_2O_5$) for orange, vanadium (III) oxide ($V_2O_3$), $Er_2O_3$, $La_2O_3$, $Tb_2O_3$, $Pr_2O_3$, $Y_2O_3$, $TaO_2$, $MnO_2$, or their mixture for black can be added. The thermal expandability of the binding agent is recommended to have $9.5\text{-}11.2\times10^{-6}/°$ C., the values between those of zirconia and lithium silicate crystalline glass.

TABLE 1

| Components | wt. % |
|---|---|
| $Na_2O$ | 0.1~1.0 |
| $B_2O_3$ | 0.1~10.0 |
| $SiO_2$ | 60.5~70.0 |
| $Li_2O$ | 10.0~15.0 |
| $P_2O_5$ | 1.5~5.5 |
| $Al_2O_3$ | 0.5~5.0 |
| $ZrO_2$ | 0.1~1.0 |
| Coloring and fluorescent agent | 0.01~10.0 |

The manufacturing process of using amorphous lithium silicate ingot glass without crystallization heat treatment is presented hereafter.

An amorphous block ingot is produced by first quenching melted materials previously heated to 1,400-2,000° C., then preparing glass powder by grinding quenched glass to increase the homogeneity of the glass, and finally shaping the glass by pouring it into the molds following reheat of glass powder to 1,400-2,000° C.

The amorphous block ingot requires an annealing process for cutting and shaping, followed by a heat treatment at 400-550° C. for 10 to 120 minutes to reduce the stress from quenching. The block ingot from this process may be directly placed on the top surfaces of zirconia in the pressurized cast process, or placed on the zirconia coated with the binding agent as described earlier.

Through the processes described above, the high strength zirconia/crystalline glass dental structure can be used to selectively manufacture artificial teeth such as veneer, posterior teeth, bridge, and so forth.

The change in strength from the exemplary embodiment is presented hereafter when high strength crystalline glass placed on the top of zirconia substructures are reinforced by the ion exchange method using nitrate alkali salt. As described in FIG. 6, biaxial strength is 404 MPa before ion reinforcement, which increases to nearly 600 MPa after 5 hours of ion reinforcement. The temperature for this process is 300-700° C. (550° C. recommended), maintaining for 10 minutes to 24 hours. Below 300° C., nitrate ion salt does not totally melt, and the effect of ion reinforcement is weakened due to low ion activity. Above 700° C., ion salt evaporates, which impede ion reinforcement reaction.

Experimental examples are presented hereafter based on exemplary embodiments of the present invention. However, aspects are not limited thereto.

EXAMPLES (1~14)

Table 2 shows the composition of the lithium silicate glass presented herein. The materials for the glass manufacture are following chemicals in first grade: $SiO_2$, $Li_2CO_3$, $Al_2O_3$, $K_2CO_3$, $Na_2CO_3$, $CeO_2$, $CaCO_3$, ZnO, $B_2O_3$, MgO, $MnO_2$, $Er_2O_3$, $V_2O_5$, $WO_3$, $Fe_2O_3$, $Li_3PO_4$. After the components in Table 2 are measured based on 100 grams of glass product, they are mixed for one hour with a gyro-blender, followed by melting at an appropriate melting temperature (1,400-1,550° C.) according to each glass component in a Pt—Rh crucible with an electric furnace. After melting each glass component at each corresponding temperature for one hour, they are quenched on a graphite plate, then crushed to produce glass powder. The glass powder is melted the second time for another hour to increase homogeneity of glass product. The glass after the second melting is poured into a 10 mm×10 mm×100 mm graphite mold to form a glass rod, then heat-treated at 555-595° C. to decrease inner stress and for the first crystal growth. (main crystal phase after the first heat treatment: lithium metasilicate) After the second heat treatment (main crystal phase: lithium disilicate), a sample is made with a diamond cutter to measure thermal expandability.

The second heat treatment for crystallization is implemented in a vacuum furnace at 750-850° C. (CAD/CAM block method), or in a pressurized cast at 850-980° C. with pressing ingot method.

TABLE 2

| | Composition of the Glass | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| $Na_2O$ | 0.4 | 0.4 | 0.4 | 0.4 | 0.4 | 0.4 | 0.4 | 0.0 | 0.2 | 0.5 | 0.4 | 0.2 | 0.4 | 0.4 |
| $B_2O_2$ | 0.1 | 0.0 | 0.0 | 0.0 | 0.0 | 0.7 | 0.5 | 8.0 | 0.0 | 0.0 | 3.0 | 6.5 | 0.0 | 0.0 |
| SiO2 | 71.1 | 73.5 | 75.7 | 77.8 | 80.0 | 72.2 | 72.2 | 71.6 | 71.4 | 71.1 | 73.3 | 71.5 | 72.0 | 72.0 |
| $K_2O$ | 3.3 | 9.9 | 3.9 | 2.3 | 1.9 | 3.9 | 3.9 | 9.9 | 3.9 | 3.9 | 1.9 | 6.8 | 3.9 | 1.0 |
| $Li_2O$ | 14.1 | 12.1 | 11.2 | 10.0 | 18.0 | 35.8 | 14.1 | 14.1 | 11.9 | 14.1 | 10.0 | 10.0 | 12.0 | 14.1 |
| $P_2O_3$ | 3.1 | 3.5 | 3.1 | 3.1 | 3.1 | 2.0 | 3.1 | 3.1 | 5.0 | 3.1 | 3.1 | 2.1 | 3.1 | 3.1 |
| $Al_2O_3$ | 3.9 | 3.8 | 3.3 | 2.8 | 1.9 | 2.6 | 3.8 | 1.0 | 3.6 | 4.8 | 5.0 | 1.8 | 3.8 | 8.6 |
| CaO | 0.3 | 0.3 | 0.3 | 0.3 | 0.3 | 0.8 | 0.3 | 0.3 | 0.3 | 0.3 | 0.3 | 0.3 | 0.8 | 0.3 |
| SrO | 0.0 | 0.0 | 0.0 | 0.0 | 0.0 | 0.0 | 0.0 | 0.0 | 0.0 | 0.0 | 0.0 | 0.0 | 0.0 | 0.0 |
| WO3 | 0.4 | 0.5 | 0.4 | 0.3 | 0.5 | 0.5 | 0.5 | 0.5 | 0.5 | 0.5 | 0.5 | 0.0 | 0.5 | 0.5 |

TABLE 2-continued

Composition of the Glass

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| ZrO2 | 0.5 | 0.0 | 0.2 | 1.0 | 1.0 | 0.0 | 0.2 | 0.3 | 0.6 | 0.6 | 0.7 | 0.1 | 0.1 | 0.1 |
| Fe$_2$O$_5$ | 0.2 | 0.2 | 0.3 | 0.2 | 0.2 | 0.3 | 0.2 | 0.2 | 0.2 | 0.2 | 0.2 | 0.8 | 0.2 | 0.2 |
| CaO$_2$ | 1.9 | 1.9 | 1.0 | 1.0 | 0.5 | 1.8 | 0.9 | 1.9 | 1.3 | 1.0 | 1.3 | 0.5 | 0.5 | 1.7 |
| V2O5 | 0.0 | 0.0 | 0.0 | 0.0 | 0.0 | 0.0 | 0.0 | 0.0 | 0.2 | 0.0 | 0.0 | 0.0 | 0.9 | 0.0 |
| Bi2O3 | 0.2 | 0.3 | 0.2 | 0.2 | 0.3 | 0.2 | 0.2 | 0.2 | 0.2 | 0.2 | 0.2 | 0.0 | 0.2 | 0.2 |
| MgO | 0.0 | 0.0 | 0.0 | 0.2 | 0.0 | 0.2 | 0.0 | 0.9 | 0.0 | 0.0 | 0.2 | 0.0 | 8.0 | 0.0 |
| MnO$_3$ | 0.0 | 0.0 | 0.1 | 0.0 | 0.0 | 0.1 | 0.0 | 0.0 | 0.3 | 0.0 | 0.0 | 0.0 | 0.3 | 3.0 |
|  | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 3

Thermal expandability of the crystalline glass

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Thermal Expandability/ $10^{-6}$ °C.$^{-1}$ (100-400° C.) | 10.5 | 10.2 | 9.8 | 9.5 | 9.3 | 10.3 | 10.2 | 9.8 | 9.6 | 11.0 | 10.5 | 10.7 | 10.3 | 10.1 |

In Table 2, more than 71.1 wt % SiO$_2$ is added in consideration of the thermal expandability of the zirconia substructures (recommended thermal expandability: 9.5-11.0×10$^{-6}$/° C., 100-400° C. in Table 3), and low ZrO$_2$ (below 1.0 wt %) is added to increase binding strength with zirconia from corrosion toward the zirconia surface such that the glass is coated on zirconia with high chemical stability.

For stronger binding, the heat treatment should be done after coating binding agent evenly on zirconia surface, followed by attaching lithium silicate amorphous or crystalline glass. The methods for such binding are cementation, heat treatment, and pressurized heat treatment and so forth.

Cementation is a well-known technique which uses adhesive cement to bind shaped crystalline glass (crown) and zirconia substructures. The heat treatment for binding uses heat-responsive binding agent to bind shaped crystalline glass (crown) and zirconia substructures, which provides higher binding strength than cementation and natural coloring expression. The pressurized heat treatment method first places the glass or crystalline glass ingot in a pressurized cast mold, then pressurized it directly on zirconia surfaces, which may shorten the process by simultaneously shaping and binding at the same time.

Other than the heat treatment implemented after a liner, an intermediate binding agent, is applied on the top surfaces of completely sintered zirconia, complete zirconia sintering and the liner binding (1450-1650° C.) can be done at the same time by applying the liner to partly sintered zirconia, that is zirconia after CAD/CAM processing, before heat treatment. This method makes liner to impregnate into zirconia surface, which increase binding strength of the liner.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a lithium silicate crystalline glass composition disposed on a surface of a zirconia substructure, comprising:
   an annealing process for a crystalline glass composition, the crystalline glass composition comprising 10-15 wt % Li$_2$O, 71.1-85.0 wt % SiO$_2$, 2-5 wt % P$_2$O$_5$, 1-5 wt % Al$_2$O$_3$, and 0.01-1.0 wt % ZrO$_2$;
   a first heat treatment process at 555-595° C. for 10 to 120 minutes; and
   a second heat treatment process at 750-980° C., comprising a pressurized casting process to attach, at 850-980° C. and at 4 bar, the lithium silicate crystalline glass composition processed by the first heat treatment process onto the zirconia substructure.

2. The method of claim 1, wherein the crystalline glass composition further comprises 0.1-6.5 wt % B$_2$O$_3$, 0.1-7 wt % K$_2$O and/or Na$_2$O, and 0.001-3 wt % MgO.

3. The method of claim 1, wherein the pressurized casting process
   pushes, after the first heat treatment process, the lithium silicate crystalline glass composition into a crown-shaped void at 850-980° C.; and
   wherein the second heat treatment process further comprises a cutting of the lithium silicate crystalline glass composition processed by the pressurized casting process into a crown shape with computer-aided design and computer-aided manufacturing (CAD/CAM) equipment, and a heat treatment process at 750-850° C.

4. The method of claim 1, further comprising:
   a binding process which binds the lithium silicate crystalline glass composition processed by the second heat treatment process onto the zirconia substructure with cementation or binding agents,
   wherein the binding process is performed at 720-850° C. for 1 minute to 120 minutes.

5. The method of claim 1, wherein the pressurized casting process further comprises:
   a heat treatment process at 750-1,000° C. for 1 to 60 minutes after a surface of the zirconia substructure is coated with a binding agent.

6. The method of claim 5, wherein the binding agent comprises at least one of titanium oxide ($TiO_2$), red iron oxide ($Fe_2O_3$), ceria ($CeO_2$), vanadium (V) oxide ($V_2O_5$), vanadium (III) oxide ($V_2O_3$), $Er_2O_3$, $La_2O_3$, $Tb_2O_3$, $Pr_2O_3$, $Y_2O_3$, $TaO_2$, and $MnO_2$.

* * * * *